United States Patent [19]

Ashley

[11] Patent Number: 5,515,230

[45] Date of Patent: May 7, 1996

[54] POLY-PHASE COAXIAL POWER LINE EFFICIENCY ENHANCEMENTS

[76] Inventor: James R. Ashley, 2523 Lake Ellen La., Tampa, Fla. 33618

[21] Appl. No.: 401,955

[22] Filed: Mar. 10, 1995

Related U.S. Application Data

[63] Continuation of Ser. No. 71,534, Jun. 4, 1993, abandoned, which is a continuation-in-part of Ser. No. 578,215, Sep. 6, 1990, Pat. No. 5,218,507.

[51] Int. Cl.$^6$ ........................................ H02H 7/00
[52] U.S. Cl. ........................ 361/107; 307/91; 174/36
[58] Field of Search ............................. 361/91, 107, 110, 361/111, 117, 118, 146, 35; 307/91, 143, 147, 148, 326, 327; 174/28, 35 R, 36, 71 C, 73.1, 78, 102 R

[56] References Cited

U.S. PATENT DOCUMENTS

| | | | |
|---|---|---|---|
| 1,625,125 | 4/1927 | LaTour | 174/34 |
| 2,306,226 | 12/1942 | Schrage | 307/91 |
| 3,322,889 | 5/1967 | Bird et al. | 174/113 R |
| 4,241,373 | 12/1980 | Mara et al. | 361/91 |
| 4,264,940 | 4/1981 | Castle | 361/91 |

Primary Examiner—A. D. Pellinen
Assistant Examiner—Ronald W. Leja
Attorney, Agent, or Firm—David Kiewit

[57] ABSTRACT

Apparatus and method are supplied for an electrical power substation used to interconnect an input three-phase power line to one or more poly-phase output distribution power lines. The teaching of the subject application shows that parasitic losses in prior art substation wiring that uses coaxial cables to conduct power into and out of the substation can be reduced by using an individual grounding rod for each outer conductor instead of following conventional practice and connecting all three conductors together at a common grounding rod. Moreover, if the three input coaxial cables to the distribution substation or the three output coaxial cables from the substation have the current in a center conductor precisely matched to the return current in the associated outer conductor, there will be neither an electric potential gradient nor a magnetic intensity outside of the transmission lines.

15 Claims, 6 Drawing Sheets

POLY-PHASE COAXIAL POWER LINE EFFICIENCY ENHANCEMENTS

This application is a continuation of the inventors's application Ser. No. 08/071,534, filed Jun. 4, 1993, now abandoned, which was a continuation-in-part of the inventor's application Ser. No. 07/578,215, issued as U.S. Pat. No. 5,218,507 on Jun. 8, 1993.

BACKGROUND OF THE INVENTION

Electrical power is distributed from central generating plants to homes, offices, and factories as three-phase alternating current. In recent years there has been an increasing public concern about possible biological effects of the low frequency electric and magnetic fields associated with the distribution and use of electrical power. Apparatus and methods for reducing such fields have been addressed by the inventor in his U.S. Pat. Nos. 5,070,441, 5,147,983, and 5,175,442, the disclosures of which are herein incorporated by reference.

Although much of the recent public outcry has been directed at high voltage transmission lines on designated rights of way, there is also a perception that substations, especially those near schools, may be a public health hazard. Measurements of electrical or magnetic fields near substations show that these fields are almost entirely caused by the power lines that enter and exit the substation. It is known that the use of coaxial cable with the outer conductor connected to an earth ground eliminates the electric field. It is also well known that there are parasitic losses associated with the use of coaxial cable and that in some cases the magnetic field measured on the surface of the earth may actually be higher over burled coaxial cables than immediately under an overhead power line.

SUMMARY OF THE INVENTION

It is an object of the invention to provide apparatus installable at poly-phase alternating current electrical power substations to substantially reduce or eliminate fringing electrical or magnetic fields near the substation and adjacent power lines entering or exiting the substation. It is a specific object of the invention to provide such reduction or elimination of fringing fields at both the fundamental and at higher harmonic frequencies.

It is a further object of the invention to improve the transmission efficiency of three-phase power distribution systems by reducing losses associated with the use of coaxial cable.

It is a further object of the invention to provide apparatus which may be retrofitted into an existing three-phase electrical power distribution system.

It is a further object of the invention to provide apparatus for electrical power transmission that substantially reduces whatever public health risk, if any, may be caused by fringing electric or magnetic fields associated with prior art substation distribution apparatus.

DETAILED DESCRIPTION

Figure 1:
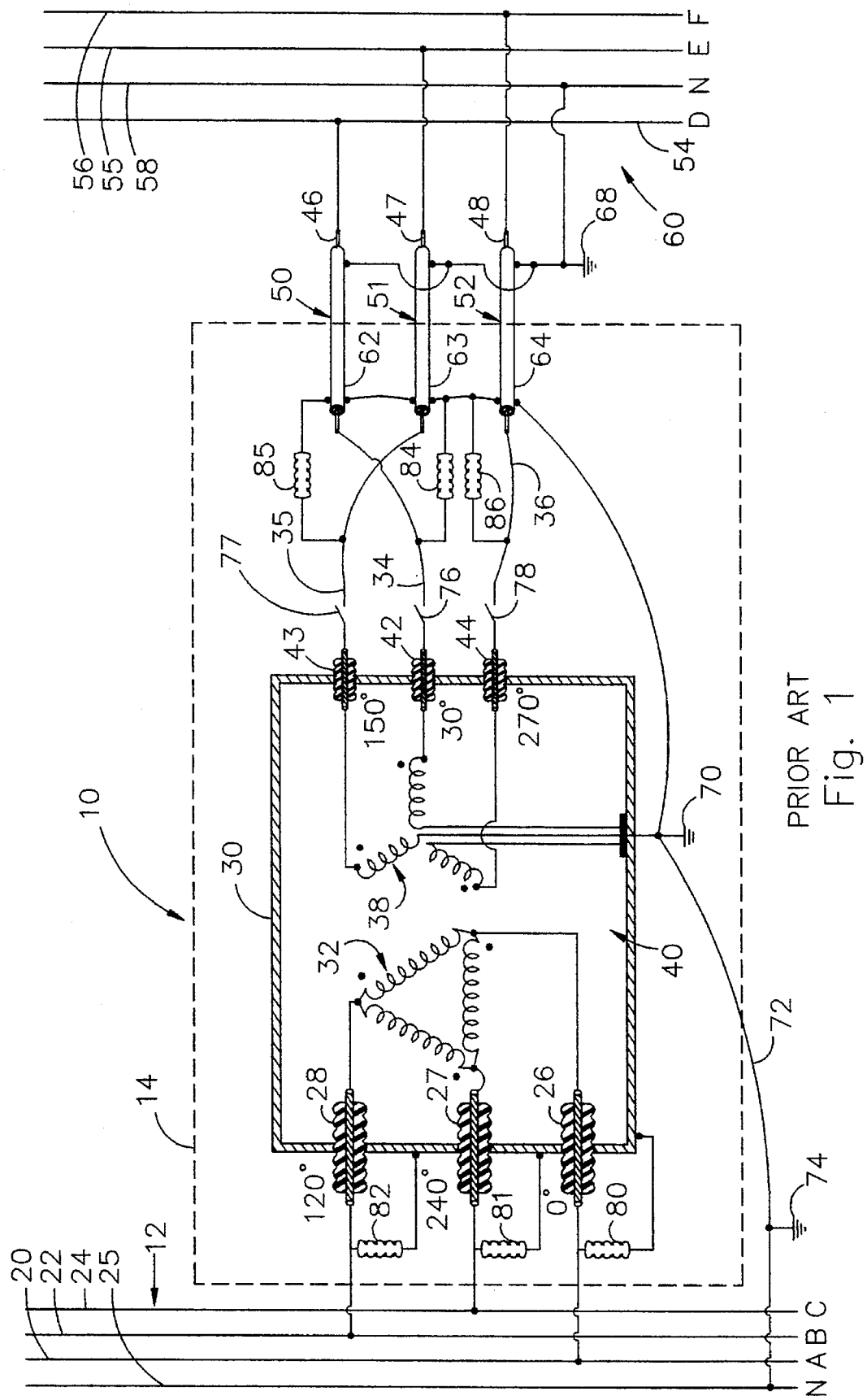
FIG. 1 of the drawing is an electrical schematic depiction of prior art wiring used in a three-phase electrical distribution substation that is supplied by an overhead-wire power line and that uses coaxial power cabling to connect transformer outputs to a three-phase, four-wire output power line. The core of the transformer is omitted from the drawing to aid in the clarity of presentation.

Turning initially to FIG. 1 of the drawing, one finds a schematic diagram of a typical three-phase substation 10 that is fed by a three-phase overhead circuit 12. Overhead ground conductors or neutral conductors 25 associated with other power lines are not part of the load carrying conductors; therefore, they are sometimes omitted from the drawing for simplicity. As shown in FIG. 1, it is conventional to connect the overhead neutral 25 to ground by means of a ground rod 74 outside the substation 10. A protective safety fence 14, used to prohibit public access, is indicated by the dashed line. Outside the fence, transmission wires without either insulation or a coaxial outer sheath must be sufficiently elevated to meet safety standards.

The three-phase conductors 20,22,24 of the feed circuit 12 are carried through insulator bushings 26,27,28 in the metal transformer housing 30 to the delta-connected primary 32 of the substation transformer. The three-phase conductors 34,35,36 from the wye-connected secondary 38 of the substation transformer 40 are likewise fed through the transformer housing 30 by insulated bulkhead connectors 42,43,44, and are then connected to the center conductors 46,47,48 of three coaxial cables 50,51,52 that are conventionally buried in an underground conduit (not shown) that passes under the protective fence 14 around the substation 10. At the ends of the cables 50,51,52 distal from the substation transformer 40, the three center conductors 46,47, 48 are connected to the three-phase conductors 54,55,56 of an overhead electrical power distribution line 60. Lightning arrestors and disconnect switches at this juncture are omitted from this figure for clarity. Observe that standard practice at the juncture of the coaxial cables and the output power line 60 is to connect the three outer conductors 62,63,64 of coaxial cables 50,51,52 to a single wire which is led down the support pole (not shown) to a single ground rod 68.

The configuration of neutral conductors and ground connections that are used in the prior art is also shown in FIG. 1 of the drawing. A neutral conductor 58 is used in both overhead and buried distribution powerlines for carrying an unbalanced current (e.g. as is introduced by a single phase load connected to a three phase line) as well as for safety purposes. The center tap of the wye-connected secondary 38 of the substation transformer 40, the outer conductor of each of the output coaxial cables 50–52, and the substation transformer housing 30 are all connected to a common substation ground 70 (conventionally a metallic grid underlying a substation and bonded to one or more ground rods). That is, as is common practice in the utility industry, the outer conductors on coaxial cables in a cabling run that uses a plurality of such cables are usually interconnected and grounded at every place where a source or load is connected.

In the prior art coaxial input wiring arrangement, the three outer conductors 62–64 are connected in parallel to serve as the load carrying neutral as well as providing a safety ground. It is common practice to employ a heavy metallic conduit (e.g. galvanized soft iron pipe) only on the portion of the coaxial cable that is exposed to public contact; e.g., the vertical run from a buried cable to the upper region of a support pole for the overhead four-wire distribution power line. Between the substation safety fence 14 and the support pole, the three cables 50–52 are directly buried, often without conduit or other mechanical protection. Although improbable, it is possible that a power shovel could dig into such a buried power line, probably breaking just one of the coaxial cables and causing a circuit fault. In this prior art wiring, current from both ends of the buried coaxial cable can flow to the short (fault) and thence back to the substation. At the substation, the over-current circuit breakers 76,77,78 are tripped to stop the flow of current.

Also shown in the view of FIG. 1 are over-voltage protectors 80,81,82 that are connected between the input high voltage conductors 20,22,24 and ground potential. These protective devices, as is known in the art, become conductive on application of a high voltage surge (e.g., as may be caused by a lightning strike). Additional circuit protection hardware that is commonly used in output circuits of a prior art substation is not shown in FIG. 1. Lightning arrestors 84–86 may be connected between the phase conductors 62,63,64 and the common substation ground 70 at the substation transformer 40 to provide over-voltage protection.

Figure 2:
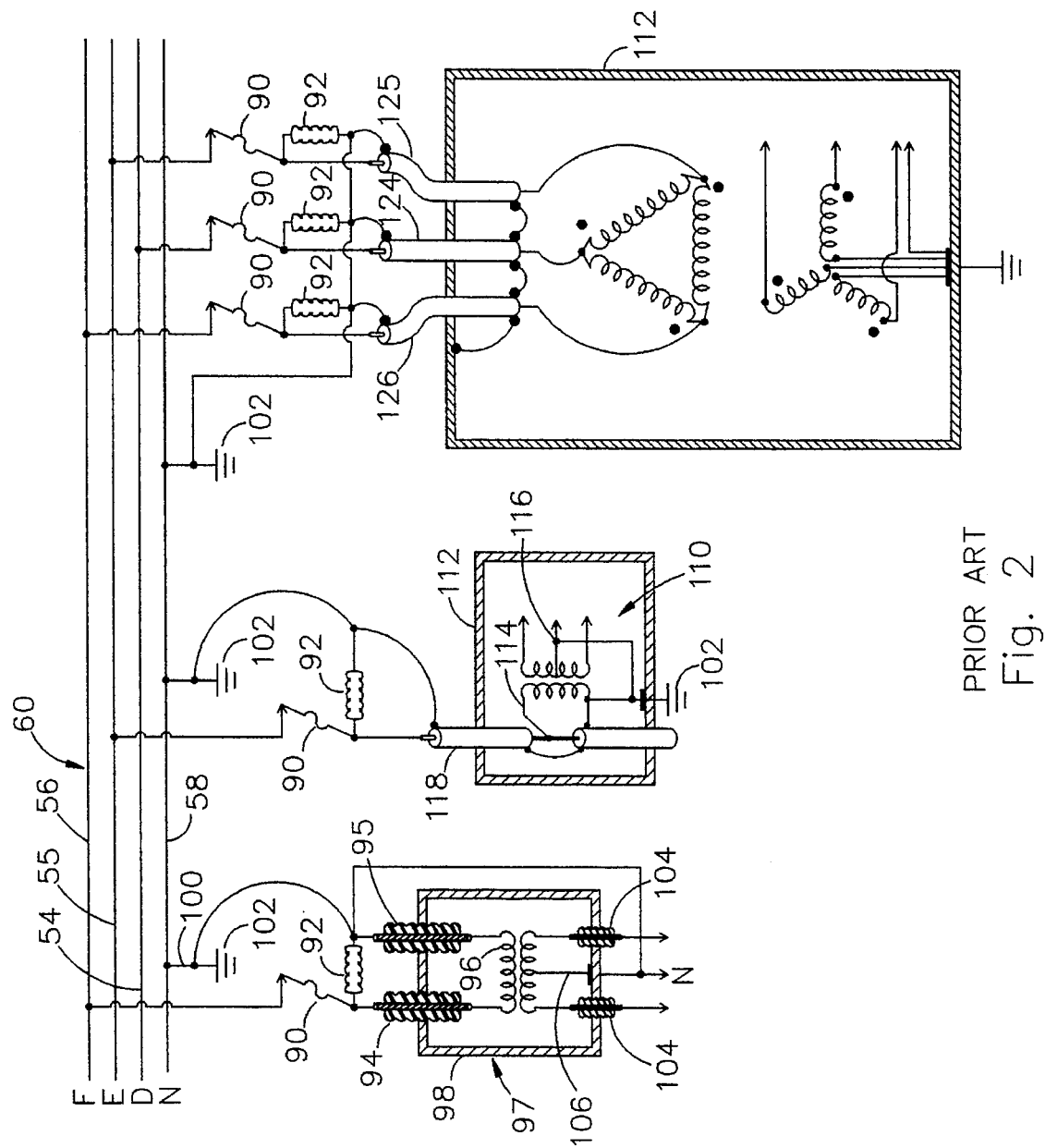
FIG. 2 of the drawing depicts prior art electrical connection of typical loads to a conventional four-wire overhead distribution power line. The connected equipment includes an overhead single phase distribution transformer, a single phase distribution transformer in a burled vault, and a three-phase transformer bank in a vault. For simplicity, the transformer cores are not shown.

FIG. 2 illustrates prior art electrical connection of several kinds of one- and three-phase customer service loads to a four-wire, three-phase overhead distribution power line. As a first example, consider the transformer 97 and its housing 98 that are typically mounted high on the power line support pole (not shown), above the neutral conductor 58 and below the three-phase conductors 54–56. Fused disconnect switches 90 are used to connect phase conductors to one end of a lightning arrestor 92 and to an input bushing 94 for the high voltage primary winding 96 of a transformer 97, which is housed in a metallic tank 98. Inside the transformer housing, the transformer primary winding is connected between two insulating bushings 94,95. The outside end of a bushing 95 is connected to the second end of a lightning arrestor 92 and then to a wire 100 which is led down the pole to a ground rod 102. The ground lead wire 100 is also directly connected to the neutral conductor 58 of the 4-wire transmission line. Each end of the secondary winding of the pole-mounted transformer 97 is connected via an insulated bushing 104 to a service drop wire going to a dwelling or other building. The center-tap 106 of this secondary winding is bonded to the transformer housing 98 and connected to both the second wire of a service drop and to the ground rod 102. Typically, a bare wire is used for the neutral conductor and as a support for the service drop cable. Two insulated wires are spiraled around this neutral conductor. In U.S. practice, 120 V loads are connected from the bare neutral to one of the insulated wires. Higher power requirement loads are engineered for 240 V and are connected between the two insulated wires inside the dwelling.

Also shown in FIG. 2 is a single phase connection from an overhead three-phase power 60 line to a single-phase transformer 110 in a buried or partially buried vault 112. In this case the fused disconnect 90 and the lightning arrestor 92 are conventionally located on the support pole (not shown) above the neutral conductor of the three-phase line 60. It is notable that the vault 112, one end of the primary winding 114, the center tap of the secondary winding 116 and both ends of the outer conductor of the coaxial feed cable 118 are connected to a common ground rod 120. This connection provides a parallel path between the vault ground rod and various neutral conductor grounds 102 along the power line 60.

Also shown in FIG. 2 is the connection of a three-phase load to the power line 60 via a three-phase transformer 122 (or, alternately, by three single phase transformers) situated in a grounded vault 112. Phase conductors 54–56 of the power line 60 are connected via fused disconnects 90 and lightning arrestors 92 to coaxial cables 124,125,126. The outer conductors of the coaxial cables 124–126 are connected to a common ground 102 at the power line 60, and are tied to the conducting grounded vault 112 at the transformer end.

The prior art interconnection of grounds shown in FIG. 1 causes parasitic currents and associated losses. Current flowing in the inner conductor of a coaxial cable induces an electromotive force (EMF) in the outer conductor. Traditional interconnection of the grounds in a three-phase, three-coaxial conductor line causes parasitic currents, because the electromotive force generated in one outer conductor has a return path via the parallel combination of the other two outer conductors. Consider a coaxial cable with inner conductor radius a and outer conductor inner radius b. Let a current I flow in the inner conductor and return via a hypothetical highly conductive cylinder of radius d. Dimension b is typically a few centimeters, d might be a few tens of meters. The inventor has shown by application of Faraday's Law that the voltage induced in the outer cable conductor is $$EMF = f\mu_0 L_x [1 \; \ln(d/b) - 1/d] I$$

where f=frequency, Hz $\mu_0$ = permittivity of free space, $4\pi \times 10^{-7}$ coul$^2$/newton meter$^2$ $L_x$=length of the cable, meters I=R.M.S. current in the inner conductor (amperes), and ln denotes the natural or Naperian logarithm.

At a frequency of 60 Hz, this evaluates to about 0.5 V/m/A. This is sufficient to cause appreciable losses if there is a path for current flow. As has been shown by the inventor in his U.S. Pat. No. 5,147,983, this loss may be prevented if one end of each outer conductor is left ungrounded.

Kirke, in U.S. Pat. No. 17235, identifies the same loss mechanism. He interrupted each coaxial outer conductor at two points in the middle of a run and divided the outer conductor into three segments of equal length having voltages equal in magnitude for balanced loads. The interconnections at the ⅓ and ⅔ points establish phase differences of 120° and 240° so that the phasor sum for any circuit path is approximately zero. Kirke maintains the interconnections at both ends of his lines. His outer conductors are usable for carrying currents associated with unbalanced loads and are also usable as protective grounds. The disclosure of Kirke is herein incorporated by reference.

The parasitic losses discussed above can be reduced, rather than being eliminated, by choosing a resistive configuration intermediate between prior art approaches and the teaching of the inventor's U.S. Pat. No. 5,147,983—i.e., by using an individual grounding rod for each outer conductor instead of following conventional practice and connecting all three conductors together at a common grounding rod. An actual ground structure or rod can be modeled as an internal resistance between the grounded apparatus terminal and a hypothetical infinite conductivity plane at the surface of the earth. On the figures of the drawing where a resistance is shown immediately above a ground symbol, the resistance is not an external component; instead, it is the internal resistance of a practical ground structure. A good ground has a finite internal resistance, which is commonly on the order of 5–30 Ohms. Thus, using a separate grounding rod for each outer conductor, rather than connecting the conductors to a common ground, will reduce the parasitic losses by the introduction of this minimum resistance. It should be noted that resistive means connecting each outer conductor to ground can provide any value of resistance between the minimal 5–30 Ohms offered by using multiple "good" grounds, and the infinite resistance previously taught by the inventor in U.S. Pat. No. 5,147,983. The effect of the choice of resistance insertion may be immediately calculated.

Co-axial transmission line theory also shows that there is no magnetic field outside the transmission line if the return current flows in the outer conductor. There is, however, an external magnetic field if some other return path is used. Hence, coaxial cable offers a way to eliminate fringing electric or magnetic fields under some circumstances. As was previously discussed in the inventor's U.S. Pat. No. 5,218,507, the use of coaxial cabling in a conventional power transmission system does not reduce or eliminate the fringing magnetic fields unless one ensures that the return current in any outer conductor of a coaxial cable is equal and opposite to the source current in the associated central conductor.

Figure 3:
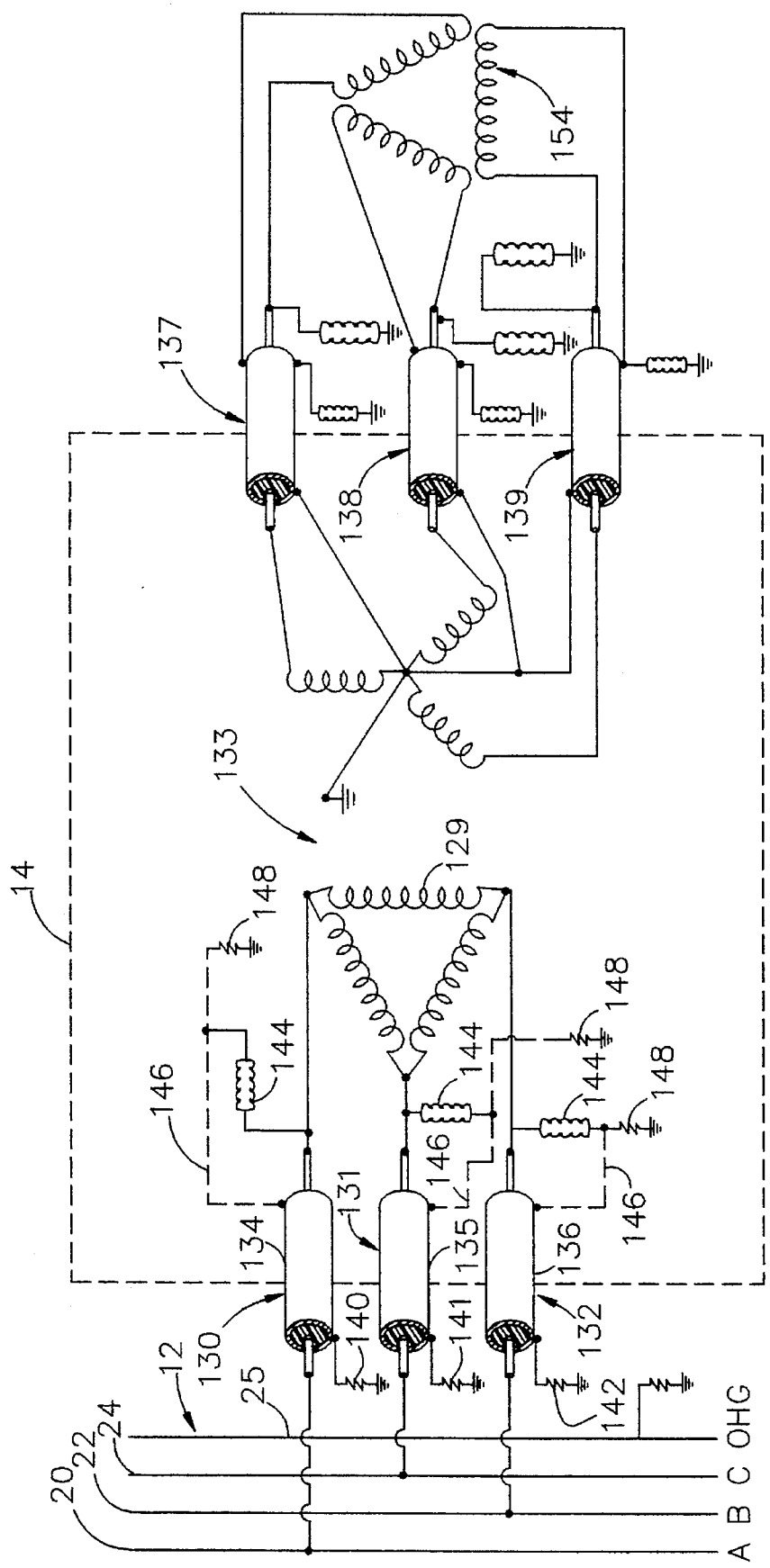
FIG. 3 of the drawing is an electrical schematic depiction of a wiring arrangement to take power from an overhead high voltage input line into a substation and from the substation to a three-phase load by means of a different coaxial cabling arrangement. This figure does not provide full detail on the output side of the substation transformer or on the output of the wye connected three-phase load transformer.

Turning now to FIG. 3 of the drawing, one finds a schematic depiction of bringing power from a high voltage line into a substation. A first triad of coaxial cables 130,131, 132 are connected between the power line 12 and the delta-connected primary winding 129 of a transformer 133. The outer conductors 134,135,136 of the input coaxial cable triad are separately grounded adjacent the power line 12 through separate grounding structure resistances 140,141, 142. This is in contradistinction to prior art, which would call for the three outer conductors to be connected together and tied to a common ground. The opposite ends of the input cables 130–132, adjacent the transformer 133, are equipped with lightning arrestors 144 for safety purposes. The outer conductors 134–136 may also be attached, via optional leads 146 to ground through separate grounding structure resistances 148, or the outer conductors, as discussed above, may be left ungrounded at this location. The output coaxial cables 137,138,139 from the wye-connected secondary of the transformer 133 may then be connected to a wye-connected load 154 in the manner previously taught in U.S. Pat. No. 5,218,507, or may be connected to a power line in accordance with methods known in the prior art.

It may be noted that making connections to a high voltage overhead power line 12 with co-axial cables 130–132, bringing these cables down whatever tower, pole or other support is used for the overhead line 12, and burying the coaxial cables 130–132 underground for their run to the transformer 133 may provide a drastic reduction in electric field adjacent the substation fence. In the prior art approach of FIG. 1 the unshielded open-wire lines 20,22,24 usually angle downward from the overhead line 12 to their juncture with the substation transformer 133, and cross the substation fence at a relatively reduced elevation above the terrain. This contributes to a high electric field on the ground just outside the safety fence.

It may be further noted that the grounding of both ends of the coaxial cables 130–132, albeit with less than perfect grounds, provides a current flow path from either end of a cable to a possible fault; e.g., the result of a power shovel digging into the cable. Returning to a consideration of FIG. 1, it is possible to use the grounding scheme illustrated in FIG. 3 for the output side of the substation transformer as well as for the input side.

Figure 4:
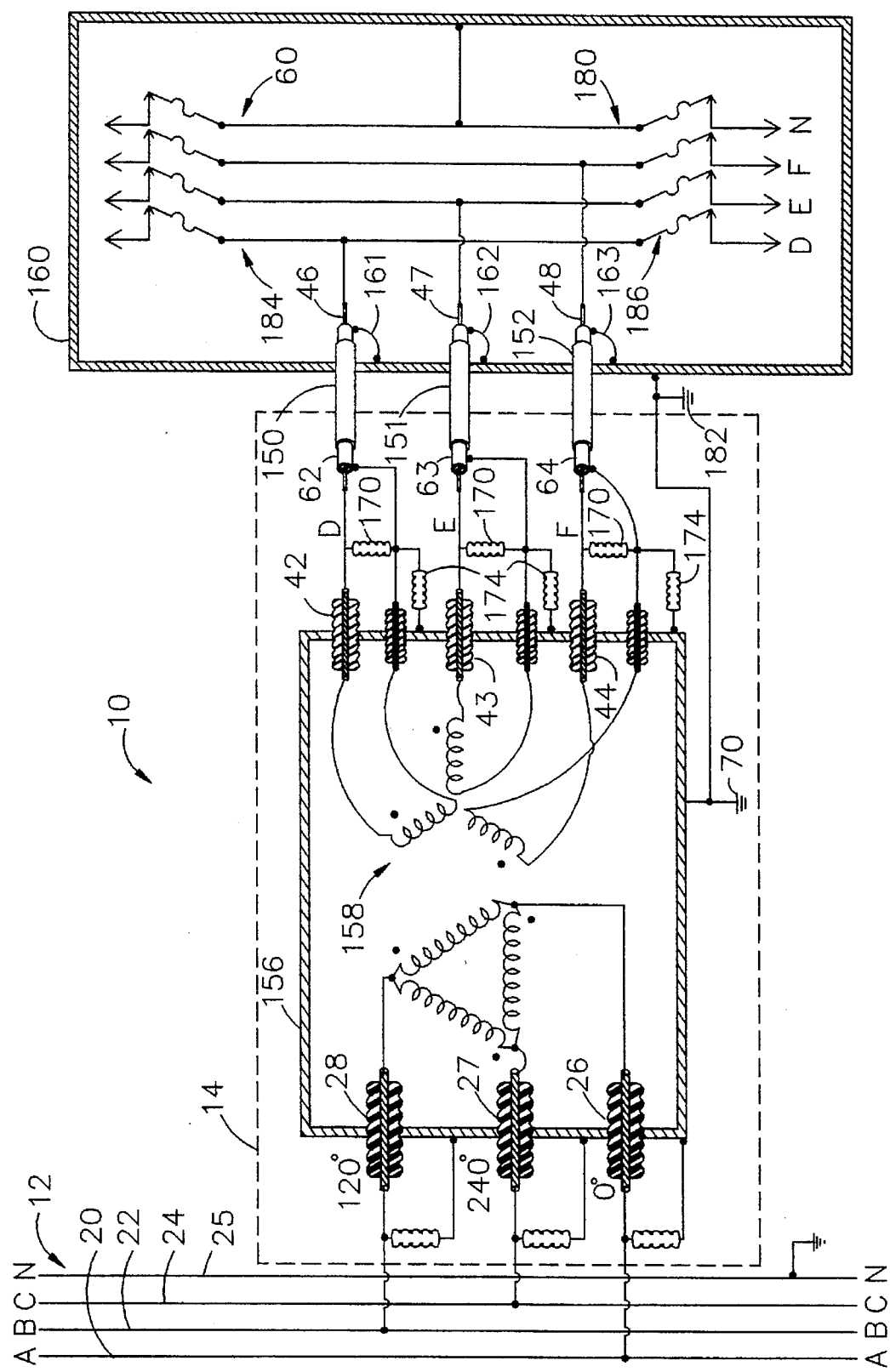
FIG. 4 of the drawing is an electrical schematic depiction of a wiring arrangement of the invention showing current distributed by a substation/to a plurality of three-phase power lines, with circuit protection devices installed adjacent the output lines.

FIG. 4 of the drawing shows additional detail of the application of these teachings to the output side of a distribution substation 10 that is connected according to the invention to reduce fringing electrical and magnetic fields and to reduce parasitic power losses. Detail has been omitted from the input side of FIG. 4 for the sake of clarity of presentation. It may be noted that the input side of FIG. 4 may be identical to one of the optional versions illustrated in FIG. 3, or may follow the prior art convention illustrated in FIGS. 1 and 2.

A safety ground 70 is shown in FIG. 4 between the case 156 of the substation transformer 158 and ground. It is noteworthy that this is connected only with the conductive case of a remote breaker vault 160 and is not common with any of the taps of the substation transformer windings. The common neutral point for the wye-connected secondary windings of transformer 158 has been moved to the inside of the remote circuit breaker vault 160 by using outer conductors 62, 63, 64 of cables 150–152 to separately connect the low voltage ends of each of the wye-connected secondary windings of the transformer 158 to the housing 160. In this fashion, a single distribution transformer can supply several distribution circuits and still preserve the advantages of this invention, namely, the total elimination of fringing magnetic fields near the coaxial cables 50–52 between the substation and the distal circuit breaker vault 160.

On the output side of the transformer 158 of FIG. 4, the high voltage ends of the wye-connected secondary windings of the transformer 158 pass through insulated bushings 42–44 and are connected to the center conductors 46–48 of output coaxial cables 150–152. The outer conductors 62–64 of the coaxial cables 150–152 may be left ungrounded (as shown in FIG. 4), or may optionally be grounded at the substation end with individual grounding leads and rods, which provides a separate equivalent grounding resistance for each outer conductor. This connection would lessen the effectiveness of the magnetic field reduction outside of the cables.

Over-voltage protection at the output side of the substation transformer 158 of FIG. 4 is provided by lightning arrestors 170 that are individually connected between each center conductors 42–48 and its associated outer conductor 62–64. A separate lightning arrestor 174 (which is drawn in FIG. 4 to be smaller than the lighting arrestors 170 to indicate that it has a lower voltage rating) is connected between each outer conductor and the safety ground represented by the transformer housing 156.

At the end of the output coaxial cable run distal from the transformer 158, outside the substation fence 14, and adjacent one or more output overhead distribution lines 60, 180, one may locate a circuit breaker box or breaker and junction vault 160 to protect the output circuit or circuits. At the breaker vault 160, the outer conductors 62–64 of the triad of output cables 150–152 and the neutral conductor 58 of an overhead distribution line 60 are bonded to the vault housing 160 and are grounded at a common ground point 182. Sets of breakers 184 and 186, as is well known in the art, are supplied for the phase conductors of the output lines 60, 180. The provision of a single breaker and junction vault 160 that provides a triad of breakers 184,186 for each separate output line 60,180, allows the single substation transformer 158 to distribute power to a multiplicity of output lines. In the prior art the breakers on the output circuits are commonly built inside the substation safety fence, instead of outside at the juncture with the distribution line. This prior art approach requires a common neutral that the wiring arrangement of the invention does not have inside the substation. Thus, moving the breakers to the point of juncture with a plurality of distribution lines is a requirement forced upon the new wiring approach if it is to be used for the normal purpose of driving a plurality of distribution lines from a single substation transformer.

The wiring arrangement described above attaches a three-phase input power line 12 to a three-phase distribution power line 60 in a way that can ensure that each of the three output coaxial cables 150–152 has the current in its center conductor precisely matched by the return current in its outer conductors as taught by the inventor in his U.S. Pat. No. 5,218,507. This balancing of outgoing and return current in a coaxial conductor ensures that there will be neither an electric potential gradient nor a magnetic intensity outside of the transmission lines—i.e. the fringing fields are eliminated both very close to the cable and remote from the cable.

An advantage of the connections shown in FIG. 4 is that if these cables are buried inside a metal conduit (which is commonly done to reduce the risk of injury to someone who accidentally digs up the powerline), the perfect magnetic shielding means provided by the invention implies that there are no eddy current losses in the conduit.

Figure 5:
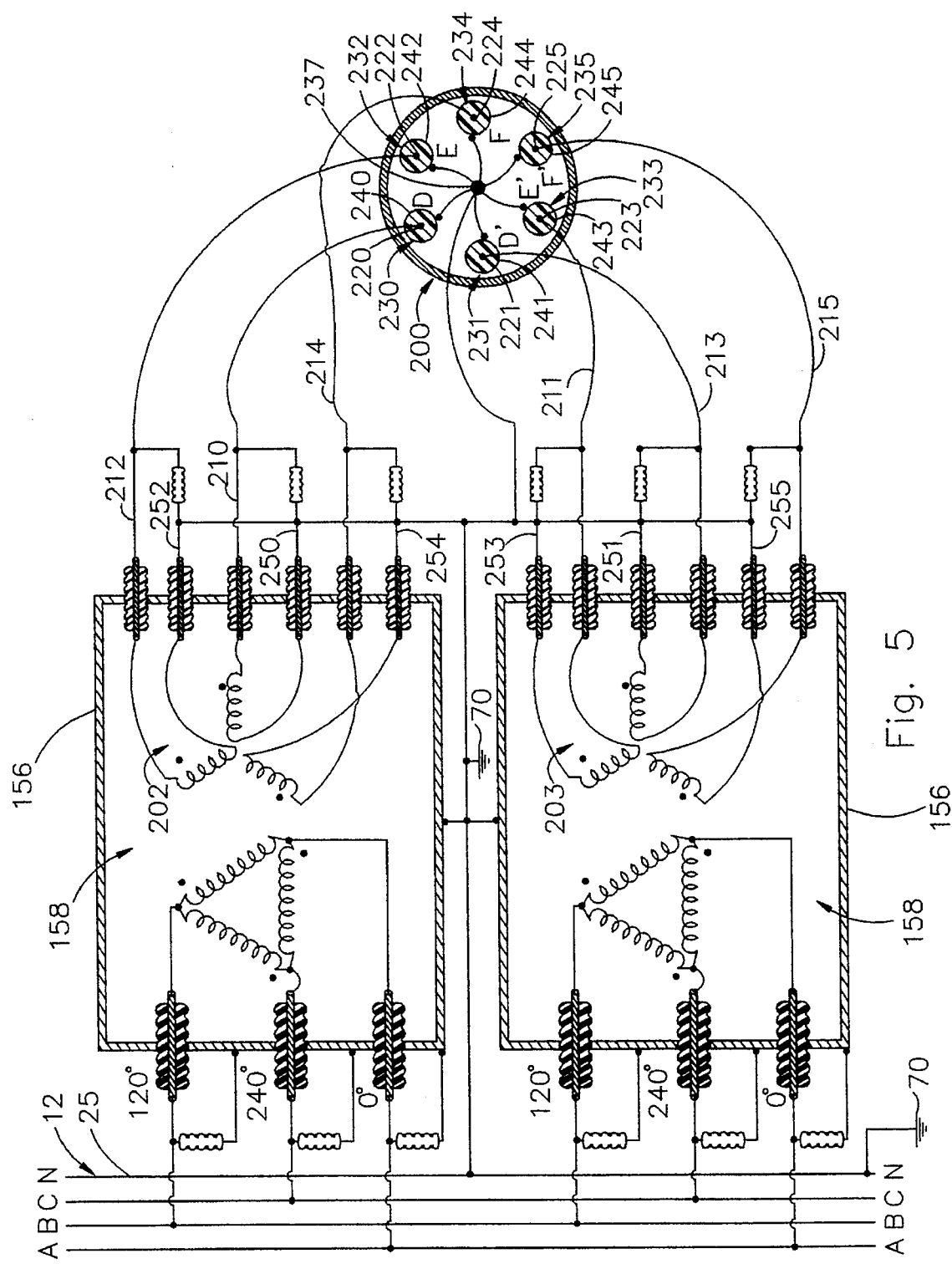
FIG. 5 of the drawing is a electrical schematic depiction of an electrical substation in which a six-phase output line, comprising a plurality of coaxial cables, is fed by a three-phase overhead open-wire input line.

Turning now to FIG. 5 of the drawing, one finds an adaptation of the transformer connection that is shown in FIG. 4 for the purpose of distributing six-phase power from a three-phase power line 12 to a six-phase coaxial line 200 that is configured according to the teaching of the inventor's U.S. Pat. No. 5,175,442, and U.S. Pat. No. 5,070,441. The input powerline 12 is connected to delta connected primary windings of two identical transformers 158. The connection of the output windings of the two secondaries 202,203 differs so that a total of six output phases is obtained in a star topology in which the common neutral points of the windings 202, 203 are connected via neutral conductors 250–255 to a ground 70 external of the transformer cases 156. (Note that one could alternately use a single six-phase transformer, in which case the connectivity of the transformer would be normally be referred to as a "star" connection, where wye is the special three-phase case of star.). Each of the six output phases 210–215 is connected respectively to a central conductor 220–225 of a coaxial cable 230–235, and the six coaxial phase cables 230–235 are arranged in a composite cable 200 about a common composite cable neutral conductor 237, which is connected to the outer conductors 240–245 of each of the six output coaxial cables 230–235. The central neutral conductor 237 is positioned centrally within the array of six coaxial cables 230–235 so that it is equidistant from all the center conductors 220–225. This is done to minimize loss in the composite cable 200. The interconnection and grounding of the neutrals 25 and 237 with the six neutral output lines 250–255 and with the cases 156 of the two transformers 158 provides safety grounding at the substation end of the coaxial line.

It may be noted that the central ends of the wye-connected secondaries 202,203 are brought out through the transformer housings 156 via insulated bushings and then grounded, rather than being bonded to the grounded case 156. This allows a common transformer to be used for a variety of applications that differ in their groundings (e.g. the applications shown in FIGS. 4 and 5 as well as the prior art shown in FIGS. 1 and 2).

Figure 6:
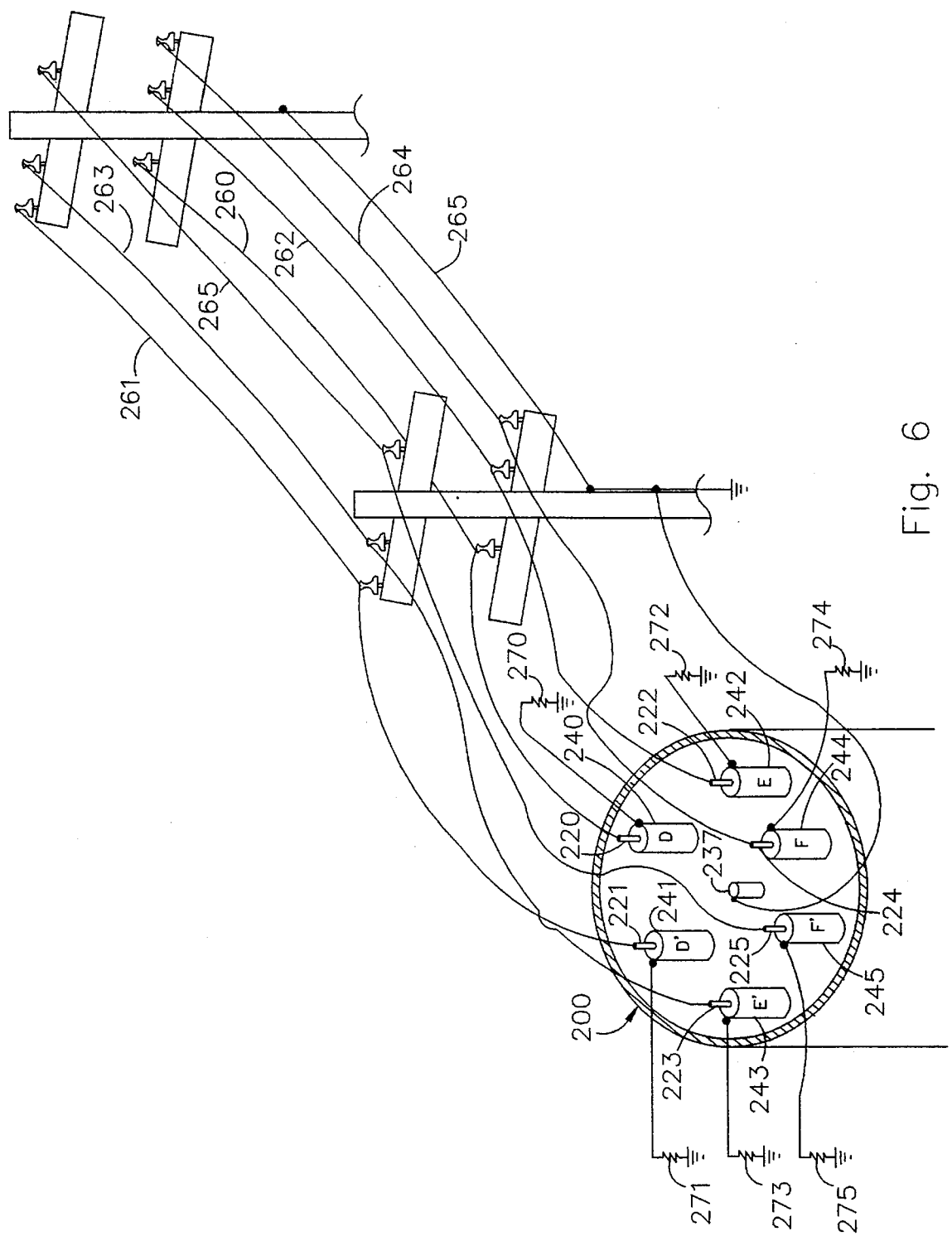
FIG. 6 of the drawing is a schematic depiction of the connection of the six-phase coaxial line of FIG. 5 to an overhead open-wire power line, with particular emphasis placed on protective grounding and on maintaining the integrity of a neutral conductor.

The preferred connection from the composite six-phase cable 200 to a six-phase open-wire power line 256 comprising six phase conductors and an open-wire neutral is shown in FIG. 6 of the drawing, where the phasing of conductors 260–265 of the open-wire power line 256 is preferably in accord with the inventor's teaching in U.S. Pat. No. 5,175,442. Notable in this figure is the provision of separate grounding rods 270–275 for each of the outer conductors 249–245. Although the outer conductors 240–245 are shown to be tied to a common ground in FIG. 5, the separate grounds shown in FIGS. 3 and 6 can also be provided there for all the reasons discussed above with respect to the three-phase case.

Similar apparatus can be provided for higher numbers of phases (e.g. 12, 18 or 24) by using known star-connected source transformers fed by the three-phase input. The ground-connection teachings of FIG. 5 and 6 are applicable to coaxial cables carrying power from any star-connected source to an overhead transmission line.

Although the present invention has been described with respect to a preferred embodiment and several minor modifications thereof, many alterations and modifications (e.g. by extending the teaching to a larger number of phases) may be made without departing from the invention. Accordingly, it is intended that all such alterations and modifications be considered as within the spirit and scope of the invention as defined in the appended claims.

I claim:

1. Apparatus for reducing fringing electric and magnetic fields adjacent a substation distributing three-phase alternating current electrical power from an input three-phase power line comprising three-phase conductors and a single current-carrying neutral conductor to an output three-phase power line, the apparatus comprising a triad of input coaxial cables, each having
        a first end adjacent the input power line,
        a center conductor and a coaxially formed outer conductor, and
        a second end adjacent a three-phase distribution transformer,
    means adjacent the first ends of the input coaxial cables respectively electrically connecting the inner conductor of each input cable to one of the phase conductors of the input power line,
    a plurality of ground rods, each of the rods separately grounding the outer conductor of one of the input cables adjacent one of the two ends thereof,
    means adjacent the second ends of the input cables respectively electrically connecting the center conductor of each input cable to an end of a primary winding of the distribution transformer.

2. Apparatus of claim 1 wherein each of the ground rods comprises a resistance of at least five ohms between the respective outer conductor and electrical ground.

3. Apparatus of claim 1 further comprising a second plurality of ground rods, each of the second plurality of ground rods respectively adjacent the other of the two ends of one of the input cables, each of the second plurality of ground rods grounding the outer conductor of the adjacent one of the input cables.

4. Apparatus of claim 3 wherein each of the second plurality of ground rods comprises a resistance of at least five ohms between the adjacent outer conductor and electrical ground.

5. Apparatus of claim 1, wherein the distribution transformer is within a first grounded conductive enclosure and wherein the distribution transformer comprises wye connected secondary windings, the apparatus further comprising coupling means coupling the secondary windings to the three-phase conductors of the output power line, and wherein the coupling means comprise a second triad of output coaxial cables, each output cable having
a first end adjacent the three-phase distribution transformer,
a center conductor and a coaxially formed outer conductor, and
a second end adjacent a second grounded conductive enclosure, means coupling each winding of the wye-connected secondary of the distribution transformer between the outer conductor and the center conductor of a respective one of the output cables at the first end thereof, a conductor having a first end electrically connected to the first grounded conductive enclosure and a second end electrically connected to the second grounded conductive enclosure, a plurality of circuit protection means located within the second grounded conductive enclosure, each of the circuit protection means respectively coupling the center conductor of one of the output cables to a corresponding phase conductor of the output power line, and means at the second ends of the output cables electrically connecting the outer conductor of each of the output cables to the second grounded conductive enclosure whereby a phase current in the center conductor of each of the coaxial cables is matched by an equal and oppositely directed return current in the outer conductor thereof.

6. Apparatus of claim 5 further comprising a first triad of lightning arrestors, each arrestor of the first triad having a first operating voltage, each arrestor of the first triad connected between the center conductor of one of the output coaxial cables and the corresponding outer conductor of that coaxial cable at a point proximal to the distribution transformer, a second triad of lightning arrestors, each arrestor of the second triad having a second operating voltage lower than the first operating voltage, each arrestor of the second triad respectively connected between the coaxially formed outer conductor of one of the output cables and ground at a point proximal to the distribution transformer.

7. Apparatus for reducing fringing electric or magnetic fields adjacent a substation distributing three-phase alternating current electrical power from the wye-connected secondary windings of a three-phase distribution transformer to a plurality of three-phase output power lines, the apparatus comprising three coaxial cables, each having
a first end adjacent the three-phase distribution transformer,
a center conductor and a coaxially formed outer conductor, and
a second end adjacent a grounded conductive enclosure, means at the first ends of the coaxial cables respectively coupling each of the windings of the wye-connected secondary of the distribution transformer between the outer conductor and the center conductor of one of the coaxial cables, a plurality of circuit protection means located within the grounded conductive enclosure, each of the circuit protection means respectively coupling the center conductor of one of the coaxial cables to a corresponding phase conductor of one of the output power lines, and means adjacent the second end of each coaxial cable electrically connecting the outer conductor of the coaxial cable to the grounded conductive enclosure, whereby a phase current in the center conductor of each of the coaxial cables is matched by an equal and oppositely directed return current in the outer conductor thereof.

8. Apparatus of claim 7 further comprising a first triad of lightning arrestors, each arrestor of the first triad having a first operating voltage, each of the arrestors of the first triad respectively electrically connected between the coaxially formed outer conductor of one of the output cables and ground at a point proximal to the distribution transformer, and a second triad of lightning arrestors, each arrestor of the second triad having a second operating voltage higher than the first operating voltage, each lightning arrestor of the second triad respectively electrically connected between the center conductor and the outer conductor of one of the output coaxial cables at a point proximal to the distribution transformer.

9. Apparatus for reducing fringing electric or magnetic fields adjacent a substation distributing alternating current electrical power having a number of phases, denoted by 3N, equal to three times a predetermined positive integer, N, from the star-connected secondary windings of a 3N-phase distribution transformer to an open-wire 3N-phase output power line having 3N phase conductors and an open-wire neutral conductor, the apparatus comprising a composite cable comprising a composite neutral conductor and 3N coaxial cables, each of the 3N coaxial cables having
a first end adjacent the distribution transformer,
a center conductor and a coaxially formed outer conductor, and
a second end adjacent the output power line, means respectively coupling each of the windings of the star-connected secondary of the distribution transformer between the outer conductor and the center conductor of one of the coaxial cables at the first end thereof, and means respectively coupling the center conductor of each of the cables to a conductor of the output power line at the second end of the cable, wherein a first of two ends of the composite neutral conductor is electrically connected to the outer conductor of each of the 3N coaxial cables adjacent the distribution transformer and the second end of the composite neutral conductor is electrically connected to the open-wire neutral of the output power line.

10. Apparatus of claim 9 wherein N is equal to one.

11. Apparatus of claim 9 wherein N is equal to two.

12. Apparatus of claim 9 further comprising 3N ground rods, each of the ground rods adjacent one of the cables at the second end thereof, each of the ground rods respectively grounding the outer conductor of the adjacent cable.

13. Apparatus of claim 9 further comprising a ground rod grounding the composite neutral conductor adjacent the second end thereof.

14. A method of reducing power losses in distributing three-phase alternating current electrical power over a triad of coaxial cables from the wye-connected secondary windings of a three-phase distribution transformer disposed in a conductive enclosure electrically connected to a first ground rod to a three-phase four-wire output power line having a neutral conductor connected to a second ground rod, each of the coaxial cables having a first end adjacent the conductive enclosure and a second end adjacent the second ground rod, a center conductor electrically connected to one of the windings at the first end of the cable, the center conductor electrically connected to a phase conductor of the output power line at the second end the cable, and an outer conductor electrically connected to the first ground rod at the first end of the cable and to the second ground rod at the second end, the method comprising the steps of a) adding a conductor connecting the first and second ground rods, and b) disconnecting each of the outer conductors from the second ground rod.

15. The method of claim 14 further comprising the steps, after Step b) of c) adding three additional ground rods, each of the three additional ground rods adjacent the second end of one of the cables, and d) respectively connecting each of the outer conductors only to that one of the three additional ground rods that it is adjacent.

\* \* \* \* \*